United States Patent
Koesters (10) Patent No.: US 10,822,140 B2
(45) Date of Patent: Nov. 3, 2020

(54) PLASTIC FABRIC COMPOSITE, PACKAGING BAG MADE OF A PLASTIC FABRIC COMPOSITE, AND A METHOD FOR MANUFACTURING A PACKAGING BAG

(71) Applicant: Mondi AG, Vienna (AT)

(72) Inventor: Jens Koesters, Wallenhorst (DE)

(73) Assignee: Mondi AG, Vienna (AT)

( * ) Notice: Subject to any disclaimer, the term of this patent is extended or adjusted under 35 U.S.C. 154(b) by 0 days.

(21) Appl. No.: 15/097,521

(22) Filed: Apr. 13, 2016

(65) Prior Publication Data

US 2016/0304239 A1 Oct. 20, 2016

(30) Foreign Application Priority Data

Apr. 14, 2015 (EP) .................................. 15163558

(51) Int. Cl.
| | |
|---|---|
| *B65D 30/04* | (2006.01) |
| *B65D 17/46* | (2006.01) |
| *B32B 27/12* | (2006.01) |
| *B32B 5/02* | (2006.01) |
| *B32B 27/32* | (2006.01) |
| *B32B 3/26* | (2006.01) |
| *B32B 7/12* | (2006.01) |
| *B32B 27/36* | (2006.01) |

(Continued)

(52) U.S. Cl.
CPC ............ *B65D 17/464* (2018.01); *B32B 3/266* (2013.01); *B32B 5/02* (2013.01); *B32B 5/024* (2013.01); *B32B 7/12* (2013.01); *B32B 27/08* (2013.01); *B32B 27/12* (2013.01); *B32B 27/32* (2013.01); *B32B 27/36* (2013.01); *B32B 37/153* (2013.01); *B32B 38/04* (2013.01); *B65D 29/00* (2013.01); *B65D 75/5844* (2013.01); *B32B 2038/042* (2013.01); *B32B 2307/582* (2013.01); *B32B 2439/06* (2013.01); *B32B 2439/46* (2013.01)

(58) Field of Classification Search
CPC B65D 75/58; B65D 75/5805; B65D 75/5811; B65D 75/5816; B65D 75/5822; B65D 75/5827; B65D 75/5833; B65D 75/5838; B65D 75/5844

See application file for complete search history.

(56) References Cited

U.S. PATENT DOCUMENTS

| | | | |
|---|---|---|---|
| 4,903,841 A * | 2/1990 | Ohsima | B65D 75/5805 229/237 |
| 6,800,051 B2 | 10/2004 | Koehn | |

(Continued)

FOREIGN PATENT DOCUMENTS

| | | |
|---|---|---|
| EP | 1 228 857 | 8/2002 |
| EP | 2 117 821 | 11/2009 |

(Continued)

*Primary Examiner* — Jes F Pascua
*Assistant Examiner* — Nina K Attel
(74) *Attorney, Agent, or Firm* — Collard & Roe, P.C.

(57) ABSTRACT

A plastic fabric composite for a plastic fabric composite bag has a strip fabric, an outer film, a plastic intermediate layer disposed between the outer film and the strip fabric, where a line of weakness in a form of a punching line is included, where the strip fabric is completely severed along the punching line, where the punching line ends in the intermediate layer and where the outer film is undamaged at the punching lines.

12 Claims, 6 Drawing Sheets

(51) Int. Cl.
   *B32B 27/08*   (2006.01)
   *B65D 75/58*   (2006.01)
   *B32B 37/15*   (2006.01)
   *B32B 38/04*   (2006.01)
   *B65D 30/00*   (2006.01)

(56) References Cited

U.S. PATENT DOCUMENTS

| | | |
|---|---|---|
| 8,540,612 B2 | 9/2013 | Skopek et al. |
| 2004/0109618 A1* | 6/2004 | Marbler .................. B65B 61/02 383/207 |
| 2008/0187695 A1* | 8/2008 | Nowak .................. B32B 27/02 428/35.2 |
| 2011/0002560 A1* | 1/2011 | Robles .................... B32B 27/12 383/92 |
| 2013/0209002 A1 | 8/2013 | Bazbaz |
| 2014/0105523 A1 | 4/2014 | Bazbaz |
| 2015/0117801 A1* | 4/2015 | Schmalholz .............. B32B 5/26 383/117 |
| 2015/0266644 A1* | 9/2015 | Bazbaz .............. B65D 75/5838 383/201 |

FOREIGN PATENT DOCUMENTS

| | | |
|---|---|---|
| WO | WO 2013/123015 | 8/2013 |
| WO | WO 2014/059283 | 4/2014 |

* cited by examiner

PLASTIC FABRIC COMPOSITE, PACKAGING BAG MADE OF A PLASTIC FABRIC COMPOSITE, AND A METHOD FOR MANUFACTURING A PACKAGING BAG

CROSS-REFERENCE TO A RELATED APPLICATION

The invention described and claimed hereinbelow is also described in European Patent Application EP 15 163 558.8, filed on Apr. 14, 2015. The European Patent Application, the subject matters of which is incorporated herein by reference, provides the basis for a claim of priority of invention under 35 U.S.C. 119(a)-(d).

BACKGROUND OF THE INVENTION

The present invention relates to a plastic fabric composite for a plastic fabric composite bag having a strip fabric, an outer film, a plastic intermediate layer disposed between the outer film and the strip fabric and a line of weakness in a form of a punching line.

A plastic fabric composite and a packaging bag formed therefrom are known from EP 1 228 857 B1, wherein a web of the plastic fabric composite is provided with a perforation and a line of weakness in the form of a perforation is formed by punching. In order to form the perforation, the plastic fabric composite is punched through in some segments, wherein perforation webs remain between the punched-out areas.

In practical use, however, the generation of a perforation is fraught with problems. First of all, the perforation webs cannot be easily separated, specifically due to the strip fabric. There is a risk that frays form or even that individual strips of the strip fabric are partially pulled out. An unclean tearing edge is observed, at least after a tearing-off along the perforation has been carried out. Attempting to reduce these disadvantages by making the perforation webs smaller, there is a risk that the plastic fabric composite will tear at the perforation in an uncontrolled manner during its processing.

In order to avoid these disadvantages, it is known from EP 2 117 821 B1 to use a laser to generate a line of weakness, wherein it can be ensured, by selecting a suitable material and suitably controlling the laser, that the plastic fabric composite web is only partially cut through. In addition to a relatively high equipment outlay for providing and controlling the laser, the material selection also is limited, because the absorption capacity of the individual layers for the laser radiation must be taken into account. If necessary, an additional laser additive must also be used, in order to increase the adsorption, which further increases costs.

The generation of lines of weakness can be utilized, during the manufacture of plastic fabric composite bags, to enable successive bags to be separated. Additionally, or alternatively, the generation of at least one line of weakness can also be advantageous for enabling a plastic fabric composite bag to be subsequently torn open. It should also be taken into account here that a plastic fabric composite, in particular, is very difficult to tear. In practical use, plastic fabric composite bags are therefore usually opened or cut open at one end, depending on the type of closure of said bag, without the plastic fabric composite being torn.

According to WO 2013/123015 A1 and WO 2014/059283 A1, a line of weakness is formed on a front wall of a plastic fabric composite bag. This line of weakness also can be punched out as a perforation or can be generated using a laser. The entire line of weakness is covered on the outside by an additional film slip, and so the openings of a perforation are covered toward the outside and, therefore, an air-tight closure is ensured, also when a packaging bag is closed. The disadvantage of the above-described embodiments, however, is that the entire line of weakness must be covered by a relatively large film slip.

SUMMARY OF THE INVENTION

The present invention overcomes the shortcomings of known arts, such as those mentioned above.

To that end, the present invention provides a plastic fabric composite for a plastic fabric composite bag, which can be separated along a line of weakness cleanly and with a uniform application of force, without incurring the risk of unintentional, premature tearing. In addition, a preferably simply manufacture should be made possible, without the use of a laser for generating the line of weakness.

The invention also provides a packaging bag formed of the plastic fabric composite that has two front walls and a method for manufacturing the packaging bag.

In an embodiment, the invention provides a plastic fabric composite for a plastic fabric composite bag having a strip fabric, an outer film, an intermediate layer made of plastic and disposed between the outer film and the strip fabric and a line of weakness in the form of a punching line. The strip fabric is completely severed along the punching line, the punching line ends in the intermediate layer and the outer film at the punching line is undamaged.

In another embodiment, the invention provides a method for manufacturing a packaging bag, wherein, in order to form a plastic fabric composite web, a web of an outer film and a web of a strip fabricare fed and are extrusion-laminated with molten plastic, forming an intermediate layer. The plastic fabric composite web is fed through a punching device, in which lines of weakness in the form of punching lines are formed at predefined intervals between a punching roller and a mating roller in such a way that the strip fabric is completely severed and the punching lines end in the intermediate layer and, therefore, the outer film remains undamaged, In the invention, a line of weakness is generated in a plastic fabric composite by punching, which line of weakness, along its course, completely severs the strip fabric but leaves the outer film undamaged. When the plastic fabric composite is torn along the punching line, it is only necessary to tear the outer film, a portion of the intermediate layer, and further layers that are optionally provided, such as an adhesion-promoter layer, for example. The strips of the strip fabric are already completely severed, which are consequently no longer capable of influencing the tear-open behavior. The result is a highly uniform tear-open behavior having a clean torn edge. In contrast thereto, the tear in a perforation jumps from perforation web to perforation web, wherein a great application of force is required for tearing the individual webs.

As a result of the uniform configuration of the punching line within the scope of the invention, there is no risk of getting stuck and/or an uncontrolled tearing also when the plastic fabric composite is folded, for example, with a folding blade or the like.

The intermediate layer forms a type of buffer for the penetration of a punching tool into the plastic fabric composite from the side of the strip fabric. In this case, the invention takes into account that relatively great forces are required for severing the strip fabric, wherein the outer film located behind it in the punching direction is not destroyed.

In order to enable highly reliable manufacturing of the plastic fabric composite, the gap width of a corresponding punching device must be precisely specified and must be maintained under the action of force. A preferably fixed, stiff mounting is advantageous for the generation of a punching line between a punching roller, which has a punching tool, and a mating roller. In certain applications, therefore, it is advantageous to omit a hydraulic adjustment, which always induces a certain amount of flexibility and to rigidly mount the punching roller and the mating roller with minimal play, wherein an adjustment of the punching depth is then only be carried out mechanically and/or by changing the thickness of a punching sheet, which has the punching tool, by the punching tool.

The outer film preferably has a substantially lesser thickness than the strip fabric, and so particular care must be taken during punching to avoid punching through. The outer layer can have a layer thickness range between 10 μm and 50 μm, where a preferred layer thickness range is between 15 μm and 30 μm. In one particular embodiment, the layer thickness is 20 μm. Suitable materials for the outer film are, in particular, polyethylene terephthalate (PET) and polypropylene (PP), in particular biaxially oriented polypropylene (BO-PP). Preferably, the outer film is provided as a monofilm, wherein, according to the inventive principles, a multilayer configuration is not ruled out.

The outer film, which usually forms a first surface of the plastic film composite, also can be provided with an imprint, wherein this is preferably produced as a reverse printing opposite the surface. The imprint is then located between the outer film and the intermediate layer and, optimally, is protected against influences from the outside. The above-described protection also is retained along the punching line, which ends in the intermediate layer.

The outer film and the strip fabric, which preferably forms a second surface of the plastic fabric composite, can be extrusion-laminated by the intermediate layer. This results in the advantage that the intermediate layer, which is introduced in a molten state between the outer film and the strip fabric, can also adapt to the fabric structure of the strip fabric and also may penetrate small intermediate spaces, achieving a particularly high adhesion. The intermediate layer has a thickness range between 50 μm and 55 μm, where a preferred intermediate layer thickness range is between 20 μm and 40 μm. In one particular embodiment, the layer thickness is 30 μm.

Possible materials for the intermediate layer are, in particular, polyolefins such as polypropylene (PP), polyethylene (PE), mixtures of polypropylene and polyethylene, and copolymers of polyethylene and polypropylene.

Optionally, an adhesion-promoter layer can be provided between the intermediate layer and the outer film, in order to achieve a high bond strength there. The adhesion-promoter layer can be applied during the extrusion-lamination, in particular, as a further layer together with the intermediate layer. The thickness of the adhesion-promoter layer is between 1 μm and 10 μm, preferably between 3 μm and 7 μm. In one particular embodiment, the layer thickness is 5 μm.

Possible adhesion promoters are, in particular, copolymers and terpolymers of polyethylene, such as, for example, ethylene butyl acrylate copolymer (EPA), ethylene ethyl acrylate copolymer (EEA), ethylene methyl acrylate copolymer (EMA), or ethylene methyl acrylate-acrylic acid terpolymer (EMAAA). Suitable adhesion promoters are available, for example, under the trade name LOTADER®.

The strip fabric is formed from mutually intersecting strips, which preferably consist of a stretched film. Polyolefine, in particular, polypropylene, is preferred. The mass per unit area is preferably between 50 g/m$^2$ and 120 g/m$^2$, for example, 70 g/m$^2$ in a particular embodiment. Due to the material used and the strip structure having free spaces, the density is preferably less than 1 g/cm$^3$, and so the thickness can be, for example, between 60 μm and 140 μm, for example, 100 μm in a particular embodiment. The width of the individual strips is between 2 mm and 4 mm, preferably between 2.5 mm and 3.2 mm. In an embodiment, the width of the individual strips is 2.85 mm.

In a method for manufacturing a packaging bag according to the invention, in order to form a plastic fabric composite web, a web of an outer film and a web of a strip fabric are fed and are extrusion-laminated with molten plastic, forming an intermediate layer. The plastic fabric composite web is fed through a punching device, in which lines of weakness in the form of punching lines are formed at predefined intervals between a punching roller and a mating roller in such a way that the strip fabric is completely severed and the punching line ends in the intermediate layer, in the direction of the thickness of the plastic fabric composite web. Therefore, the outer film remains undamaged, and wherein individual packaging bags are formed from sections of the plastic fabric composite web.

The punching lines are provided for different purposes, according to the invention. For example, the punching lines can be provided for forming the individual sections, wherein the sections can then be torn apart from one another along the punching lines during the course of the manufacturing process.

Within the scope of such a configuration, the finished plastic fabric composite bag then no longer has the line of weakness in the form of a punching line.

Additionally or alternatively, the punching line can be utilized to permit easy tearing-open of the finished plastic fabric composite bag. The line of weakness is then generated only over a portion of the width of the plastic fabric composite web, wherein the line of weakness is disposed with respect to the plastic fabric composite bag in such a way that the line of weakness is disposed on a front wall or, in the case of a gusseted bag, on a gusset. In the simplest case, the punching line is a straight line at which opening can be carried out, such that it is necessary only to separate the outer film, a portion of the intermediate layer and, optionally, an adhesion-promoter layer.

According to the invention, the strip fabric, which ensures a high stability, is already separated. However, the punching line, as a tear-open aid, also ensures a tight closure, and so, in particular, packaging bags that are closed in an air-tight manner, or packaging bags having a controlled valve function are provided.

In a variation, the punching line can extend on one of the front walls in the manner of a frame, wherein the punching line then borders a section that can be removed from the corresponding front wall. In particular, an elongate removable section is provided that extends in the transverse direction on one of the front walls. In order to permit initiation of a tear, an adhesive slip is provided on one end of this section, which slip can be easily grasped by a user.

A packaging bag having a punching line that is provided as a tear-open aid, in particular, having two front walls, wherein the outer film forms a bag outer side and the strip fabric forms a bag inner side, for example, characterized in that the punching line forms a tear-open aid and most preferably and/or where the punching line extends on one of the front walls in the manner of a frame and borders a section, which can be removed from the corresponding front wall.

However, additionally or alternatively, where the punching line is included to enable a separation of consecutive sections during the manufacture of the packaging bag, the line of weakness is advantageously designed so that the line of weakness extends along the entire width of the plastic fabric composite web. Consequently, after the formation of the line of weakness in the form of a punching line, the plastic fabric composite web is folded into a plastic fiber tube with or without gussets and is closed on the periphery before individual tube pieces are separated from one another along the line of weakness.

Preferably, the punching line has steps along its extension in the direction of the width in order to form a staggering, as is known from the prior art, and to then allow one of the two front walls to overhang at the upper edge and/or at the lower edge of the packaging bag to be formed.

In an embodiment as a gusseted bag, the punching line is formed in such a way that the steps are located at the transitions from the gussets to the front walls.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
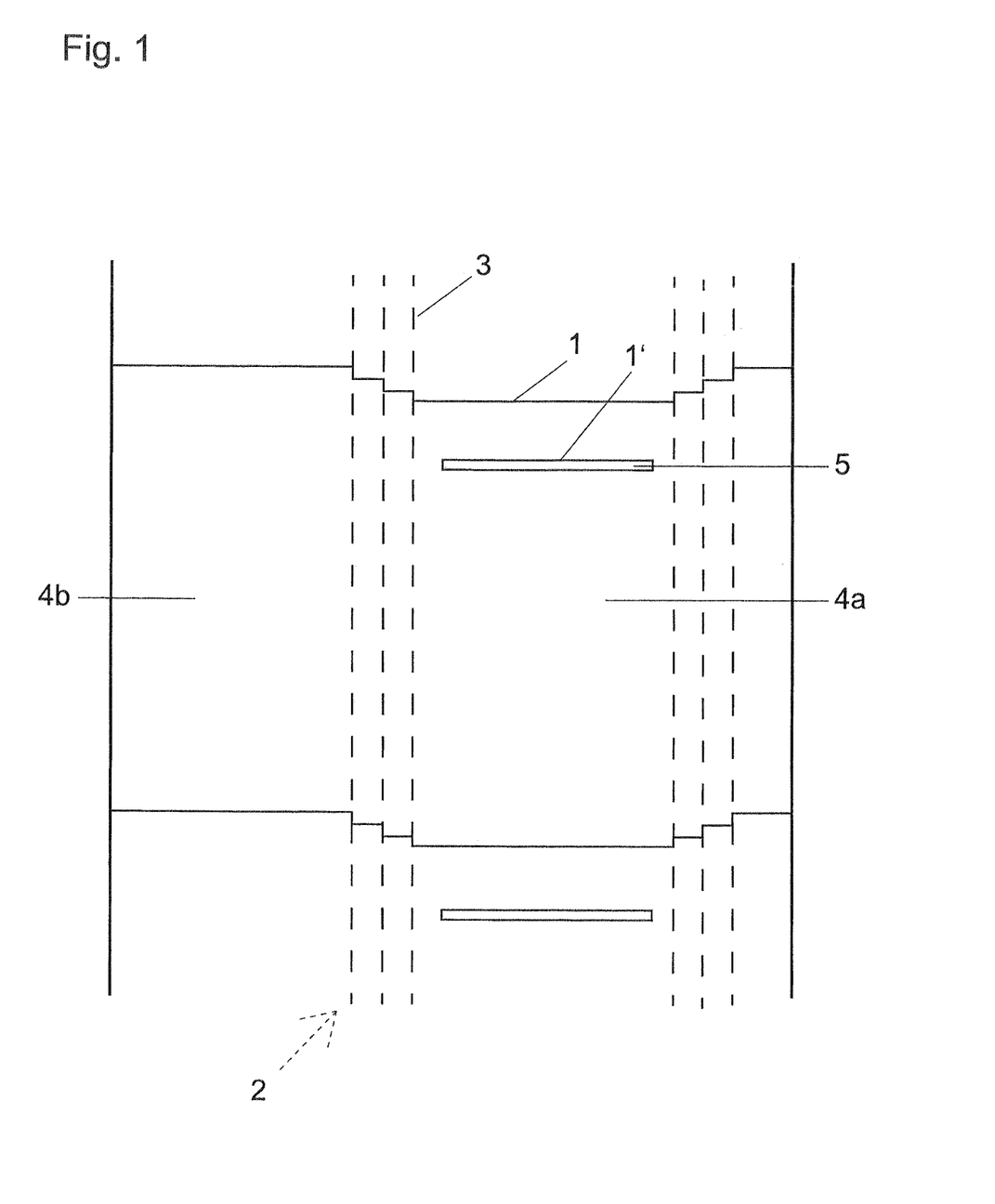
FIG. 1 depicts a web of a plastic fabric composite.

FIG. 1 depicts a plastic fabric composite web, which has a line of weakness in the form of a punching line 1 that extends in the direction of the width at equal intervals. Proceeding from the plastic fabric composite web, a plastic fabric composite tube having gussets 2 is formed in the following by folding (for example, see FIG. 4), wherein the subsequent folded edges 3 are shown as dashed lines for facilitating the assignment. The punching line 1 has steps along its extension, in the direction of the width, wherein the steps are formed at the transitions from the gussets 2 to the opposing front walls 4a, 4b.

Figure 4:
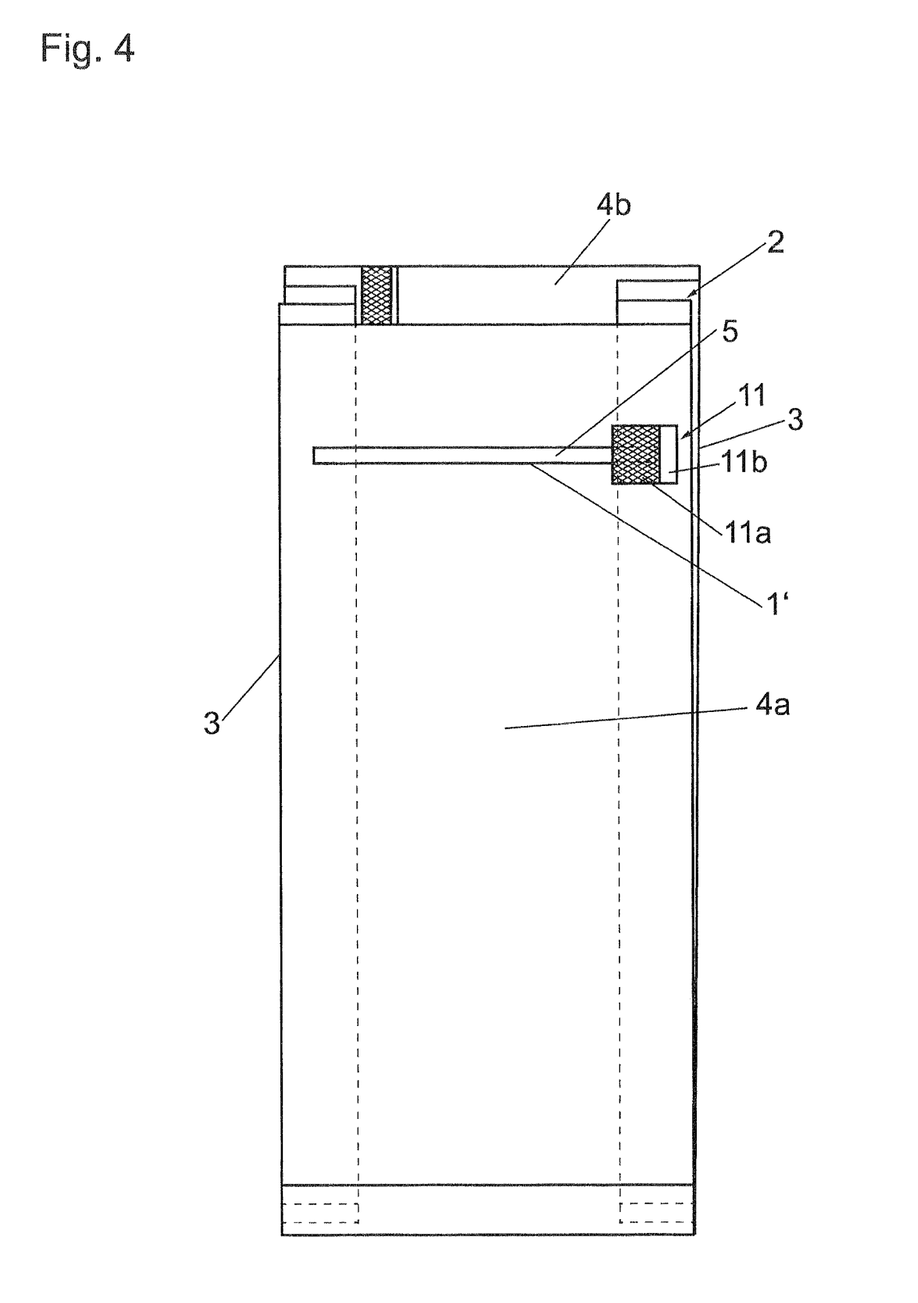
FIG. 4 depicts a blank of a packaging bag having gussets, which is formed from a section of the plastic fabric composite web according to FIG. 1.

As is evident from FIG. 4, one of the front walls 4a overhangs at a lower bag edge and the other front wall 4b overhangs at an upper bag edge. As a result of the staggering, it is possible to fold over the corresponding areas and fasten them, for example, with adhesive. And as is evident from FIG. 1, a further punching line 1' is formed on one of the front walls 4a. This further punching line 1' surrounds a removable section 5 in the subsequently produced packaging bag.

Figure 2:
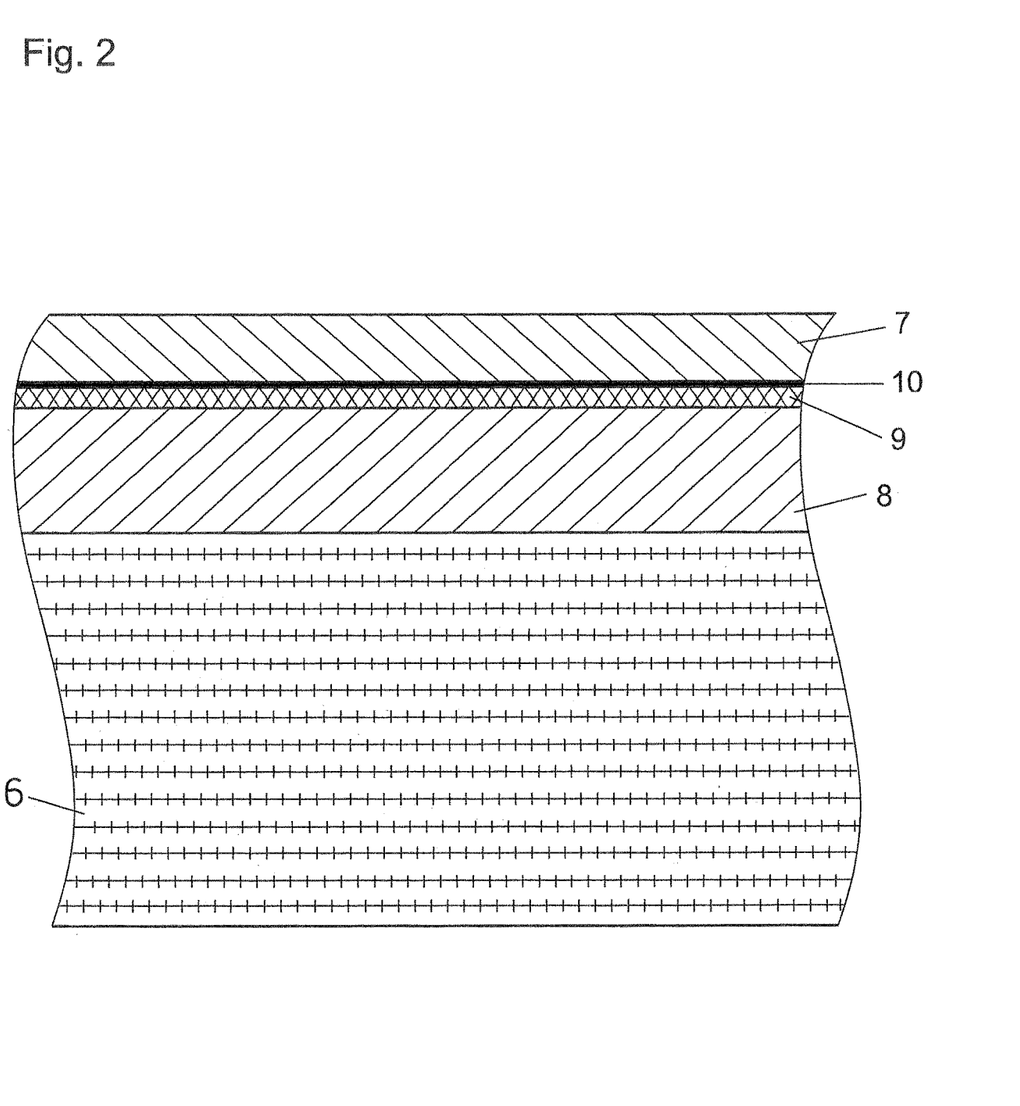
FIG. 2 depicts a sectional illustration of the design of the plastic fabric composite.

The layered design of the plastic fabric composite is shown in FIG. 2. The plastic fabric composite includes a strip fabric 6, an outer film 7, an intermediate layer 8 between the strip fabric 6 and the outer film 7 and an adhesion-promoter layer 9.

The strip fabric 6 and the outer film 7 form opposing surfaces of the plastic fabric composite, wherein, in the case of a packaging bag formed from the plastic fabric composite, the outer film 7 forms a bag outer side and the strip fabric 6 forms a bag inner side.

The strip fabric 6 provides the greatest portion of the thickness of the plastic fabric composite. The strip fabric 6, which is formed from stretched film strips based on PP, typically has a thickness between 60 µm and 140 µm. In the exemplary embodiment, the thickness is approximately 90 µm.

The subsequent intermediate layer 8 is formed on the basis of polyolefine, wherein this can be, in particular, polyethylene, polypropylene, a mixture of polyethylene and polypropylene or also a polyolefine copolymer. The thickness is usually between 20 µm and 55 µm; in the exemplary embodiment, it is approximately 30 µm.

The intermediate layer 8 is incorporated, together with the adhesion-promoter layer 9, between the strip fabric 6 and the outer film 7, in an extrusion lamination, and so is reliable with good adhesion results. In particular, the initially molten material of the intermediate layer 8 adapts to the structure of the strip fabric 6 and, if necessary, can also penetrate the intermediate spaces to a certain extent. In the exemplary embodiment, the adhesion-promoter layer 9 has a thickness of approximately 5 µm and consists of a polyethylene copolymer or polyethylene terpolymer.

Provided as the outer film is a monofilm made of biaxially oriented polypropylene having a thickness between 10 µm and 50 µm, which is provided with an imprint 10 on its side adjoining the adhesion-promoter layer 9. As a result of this imprint 10, which is located on the inside and is applied in a reverse printing, a particularly high-quality appearance is achieved. The imprint 10 also is optimally protected by the outer film 4. In the exemplary embodiment shown, the thickness of the outer film is approximately 18 µm.

Figure 3:
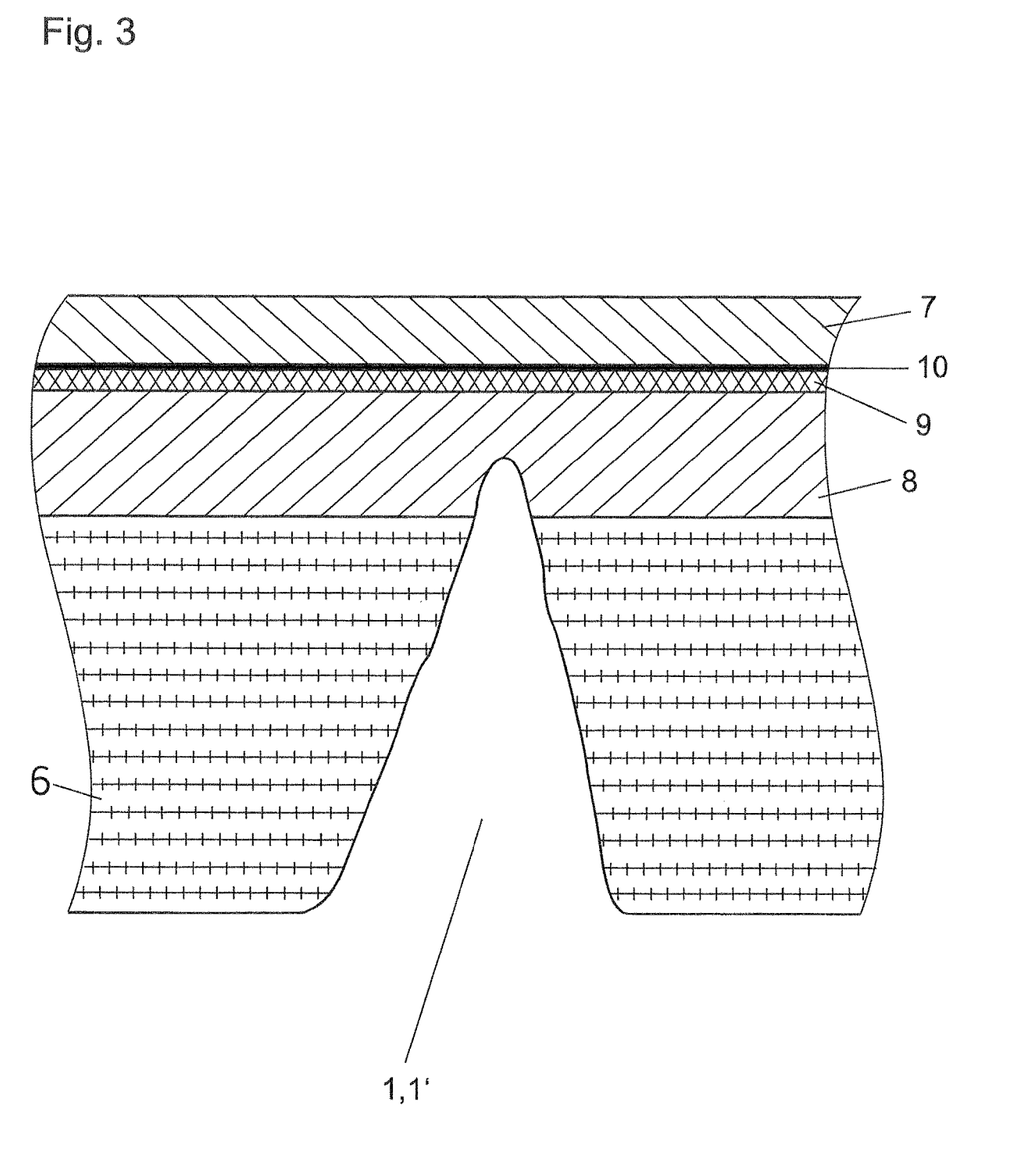
FIG. 3 depicts the plastic fabric composite according to FIG. 2, having a line of weakness in the form of a punching line.

FIG. 3 shows the plastic fabric composite at the above-described punching lines 1, 1'. According to the invention, the strip fabric 6 is completely severed along the punching lines 1, 1', wherein the punching lines 1, 1' end in the intermediate layer 8 and, therefore, the outer film 7 is undamaged at the punching lines 1, 1'.

Multiple advantages are achieved as a result. Initially, the plastic fabric composite remains closed, which is advantageous, in particular, with respect to the generation of a tear-open aid by means of the punching line 1, 1'. In addition, as a result of the uniform structure of the punching line 1, 1', a particularly uniform tearing-open is possible, because all that needs to be torn along the punching line 1, 1' is the outer film 7, a portion of the intermediate layer 8, and the optionally provided adhesion-promoter layer 9. The force required for tearing open can be set so specifically that a controlled tearing with a clean tearing edge is possible, and inadvertent tearing is prevented.

Finally, FIG. 4 shows, by way of example, a blank of a packaging bag that has not yet been filled. As described above, the edges easily can be folded over and glued, due to the staggered extension of the punching lines 1, 1a. The gussets 2 also provide for a large fill volume of the packaging bag, wherein a block shape results that also provides for better stacking and standing-up, in contrast to a simple cushion shape without gussets.

The punching line 1 disposed on one of the front walls 4a is utilized to provide a removal opening, wherein the removable section 5 is torn out of the associated front wall 4a. In order to facilitate such a tearing-out, a small film slip 11 is provided at one end of the section 5, wherein a first area 11a of the film slip 11 is glued on the section 5 using adhesive and a second area 11b of the film slip 11 is free of adhesive. The second area 11b of the film slip 11, therefore, can be easily grasped by a user.

Figure 5:
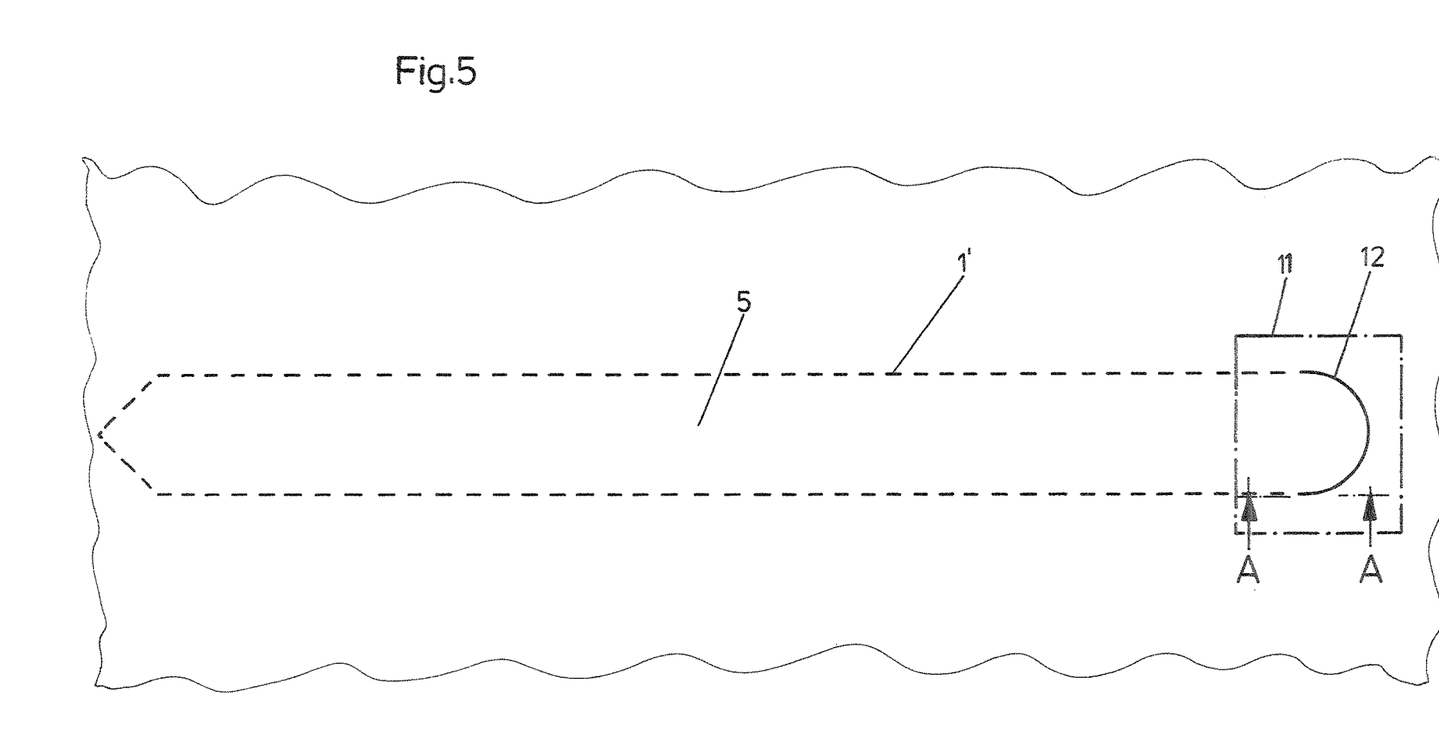
FIG. 5 depicts an alternative embodiment of a weakening line for forming a 10 removable section.

FIG. 5 shows an alternative embodiment of a punching line 1, which 15 borders a removable section 5. As in the previously described embodiment, one end of the removable section 5 is covered by a film slip 11 in order to enable an easy initiation of a tear. An almost semi-circular punching-through 12, which cuts through the entire plastic fabric composite and enables an easy opening, is provided, where the film slip 11 covers the removable section 5. The glued film slip 11 ensures a secure covering. The punching line 1, which is attached to the punching-through 12, ends within the intermediate layer 8. The depth of the punching in the intermediate layer 8 differs in an alternating manner along the course of the punching line 1. Similar to a perforation, the tear-out forces which are required for an opening, are modulated by the form of the punching line 11, wherein there is no complete intersection.

Figure 6:
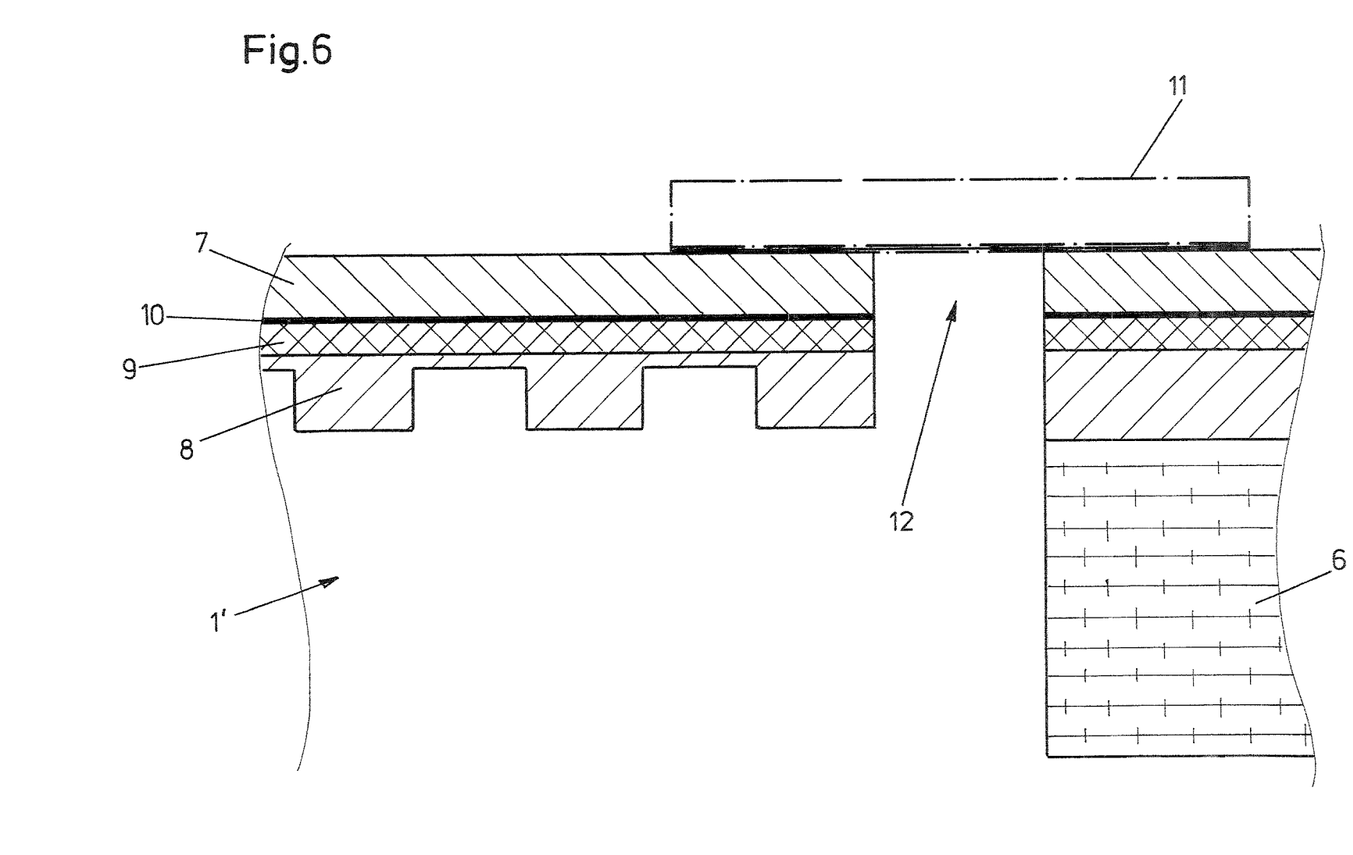
FIG. 6 depicts a section along line A-A of FIG. 5.

According to FIG. 6, the depth of the punching line 11 in the intermediate layer 8 differs in an alternating manner between sections with a low punching depth and sections, which are almost 5 completely severed.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A plastic fabric composite for a plastic fabric composite bag, comprising:
   a strip fabric;
   an outer film;
   a plastic intermediate extrusion layer disposed between the outer film and the strip fabric;
   wherein a line of weakness in a form of a punching line extends through the strip fabric and terminates within the plastic intermediate extrusion layer;
   wherein the punching line enables the strip fabric to be completely severed along the punching line without damaging the outer film,
   wherein the outer film and the strip fabric are extrusion-laminated by molten plastic that forms the intermediate extrusion layer between the outer film and strip fabric,
   wherein the intermediate extrusion layer has a thickness between 20 μm and 55 μm and wherein the outer film has a lesser thickness than the intermediate extrusion layer.

2. The plastic fabric composite according to claim 1, wherein the outer film has a layer thickness in a range of between 10 μm and 50 μm and is selected from a material from the group consisting of polyethylene terephthalate (PET), polypropylene (PP) and biaxially oriented polypropylene (BO-PP).

3. The plastic fabric composite according to claim 1, wherein an adhesion-promoter layer with a thickness in a range between 1 μm and 10 μm is disposed between the intermediate extrusion layer and the outer film.

4. The plastic fabric composite according to claim 1, wherein the strip fabric is formed of strips of a stretched film and has a mass per unit area in a range of between 50 g/m$^2$ and 120 g/m$^2$.

5. A packaging bag made from a plastic fabric composite according to claim 1, wherein the packaging bag comprises two front walls, wherein the outer film forms a bag outer side and wherein the strip fabric forms a bag inner side.

6. The packaging bag according to claim 5, wherein the punching line forms a tear-open aid.

7. The packaging bag according to claim 6, wherein the punching line extends on one of the front walls in a manner of a frame and borders a section that is removable from the corresponding front wall.

8. A method for manufacturing a packaging bag, comprising the steps of:
   forming a plastic fabric composite web by feeding a web of an outer film and a web of a strip fabric and extrusion-laminating the outer film and the strip fabric with molten plastic, thereby forming an intermediate extrusion layer between the outer film web and the strip fabric web, wherein the intermediate extrusion layer has a thickness between 20 μm and 55 μm and wherein the outer film has a lesser thickness than the intermediate extrusion layer; and
   feeding the plastic fabric composite web through a punching device and forming lines of weakness in a form of punching lines at predefined intervals, between a punching roller and a mating roller so that the strip fabric is completely severed and such that the punching lines end in the intermediate extrusion layer such that the outer film remains undamaged; and
   forming individual packaging bags from sections of the plastic fabric composite web.

9. The method according to claim 8, wherein the lines of weakness are formed to extend across an entire width of the plastic fabric composite web.

10. The method according to claim 9, further comprising subsequently folding the plastic fabric composite web into a plastic fabric composite tube, closing the folded plastic fabric composite tube on a periphery and separating individual tube pieces from one another along the line of weakness.

11. The method according to claim 10, wherein the line of weakness has steps along its extension in the direction of the width of the plastic fabric composite web.

12. The method according to claim 11, wherein the individual packaging bags include front walls and wherein the subsequently folding comprises forming the plastic fabric composite tube with gussets in such a way that the steps are located at transitions from the gussets to the front walls.

* * * * *